(12) United States Patent
Addink

(10) Patent No.: US 7,711,454 B2
(45) Date of Patent: May 4, 2010

(54) WATER SAVINGS SYSTEM

(75) Inventor: John W Addink, Riverside, CA (US)

(73) Assignee: John Addink, Riverside, CA (US)

(*) Notice: Subject to any disclaimer, the term of this patent is extended or adjusted under 35 U.S.C. 154(b) by 0 days.

(21) Appl. No.: 11/347,521

(22) Filed: Feb. 2, 2006

(65) Prior Publication Data

US 2006/0155489 A1 Jul. 13, 2006

Related U.S. Application Data

(63) Continuation-in-part of application No. 11/217,252, filed on Aug. 31, 2005, now Pat. No. 7,330,796.

(51) Int. Cl.
*G05D 11/00* (2006.01)
*A01G 27/00* (2006.01)

(52) U.S. Cl. .................. 700/284; 239/69; 137/78.2

(58) Field of Classification Search .......... 700/284, 700/283; 239/63, 67–70; 702/45, 50, 55; 73/861, 861.69; 137/236.1, 386, 78.2
See application file for complete search history.

(56) References Cited

U.S. PATENT DOCUMENTS

| | | | |
|---|---|---|---|
| 5,023,787 A * | 6/1991 | Evelyn-Veere | 700/284 |
| 5,097,861 A | 3/1992 | Hopkins et al. | |
| 5,208,855 A | 5/1993 | Marian | |
| 5,229,937 A | 7/1993 | Evelyn-Veere | |
| 5,479,339 A | 12/1995 | Miller | |
| 5,696,671 A | 12/1997 | Oliver | |
| 5,870,302 A * | 2/1999 | Oliver | 700/284 |
| 5,885,203 A * | 3/1999 | Pelletier | 588/249 |
| 6,102,061 A | 8/2000 | Addink | |
| 6,227,220 B1 | 5/2001 | Addink | |
| 6,281,801 B1 * | 8/2001 | Cherry et al. | 73/61.41 |
| 6,298,285 B1 | 10/2001 | Addink et al. | |
| 6,453,216 B1 * | 9/2002 | McCabe et al. | 700/284 |
| 6,892,113 B1 | 5/2005 | Addink et al. | |
| 6,892,114 B1 | 5/2005 | Addink et al. | |
| 6,944,523 B2 | 9/2005 | Addink et al. | |
| 6,947,811 B2 | 9/2005 | Addink et al. | |
| 6,950,728 B1 | 9/2005 | Addink et al. | |
| 2003/0183018 A1 * | 10/2003 | Addink et al. | 73/861.69 |
| 2005/0235306 A1 * | 10/2005 | Fima | 725/10 |

* cited by examiner

*Primary Examiner*—Charles R Kasenge

(57) ABSTRACT

An irrigation controller has run-times that are modified as a function of a calculated volumetric irrigation amount and a preferred irrigation amount. The preferred irrigation amount is at least partly based on an evapotranspiration (ETo) value and the area of the irrigated site. The calculated volumetric irrigation amount is based on flow meter data and inputted irrigation run-times. Preferably the flow meter is a water meter that measures water distributed to the irrigation system and to other water using devices at the irrigated site, and the flow data is based on signature data. In addition to flow data, water pressure may be measured that corresponds with the flow data. It is anticipated that the function will involve the dividing of the preferred irrigation amount by the calculated volumetric irrigation amount to arrive at a modifying factor.

15 Claims, 4 Drawing Sheets

WATER SAVINGS SYSTEM

CROSS-REFERENCE TO RELATED APPLICATIONS

This application is a Continuation-In-Part of U.S. application Ser. No. 11/217,252, filed on Aug. 31, 2005, now U.S. Pat. No. 7,330,796 which claims priority from U.S. patent application Ser. No. 10/297,146, filed on Aug. 11, 2003, now issued as U.S. Pat. No. 6,963,808, which is a national phase of PCT Application No. PCT/US00/15480, filed on Jun. 5, 2000, all of which are hereby incorporated by reference in their entirety.

FIELD OF THE INVENTION

The field of the invention is water savings.

BACKGROUND OF THE INVENTION

Water is becoming one of the most precious natural resources in arid areas of the world. Meeting future water needs in these arid areas may require aggressive conservation measures. This in turn requires irrigation systems that apply water to the landscape based on the water requirements of plants in that particular landscape.

Many automatic irrigation controllers are known. They range from simple devices that control watering times based upon fixed schedules, to sophisticated devices that vary the watering schedules according to local geography and climatic conditions.

With respect to the simpler types of irrigation controllers, a homeowner typically sets a watering schedule that involves specific run times and specific days for each watering station. With these simple types of controller systems, the controller executes the same schedule regardless of change of seasons or weather conditions. Typically, the homeowner would manually adjust the watering schedule, but only a few times during the year. The adjustments are generally based on the homeowner's perceptions rather than the actual watering needs of the landscape. One manual adjustment is typically made in late Spring, when a portion of the yard becomes brown due to a lack of water. Another manual adjustment is typically made in late Fall, when the homeowner assumes that vegetation does not require as much watering. These manual adjustments to the watering schedule are typically insufficient to achieve efficient watering. Further, such controllers do not provide feedbacks to homeowners with respect to the efficiency of their watering practices.

More sophisticated irrigation controllers use evapotranspiration rates to determine the amount of water needed for a landscape. Evapotranspiration (ETo) is the process whereby water is discharged into the atmosphere by direct evaporation from the soil and the plant, and by transpiration from the plant's surface. Irrigation controllers that derive all or part of the irrigation schedule from ETo data (ET irrigation controllers) are discussed in U.S. Pat. No. 5,479,339, issued December 1995, to Miller, U.S. Pat. No. 5,097,861, issued March 1992 to Hopkins, et al., U.S. Pat. No. 5,023,787, issued June 1991, and U.S. Pat. No. 5,229,937, issued July 1993, both to Evelyn-Veere, U.S. Pat. No. 5,208,855, issued May 1993, to Marian, U.S. Pat. No. 5,696,671, issued December 1997, and U.S. Pat. No. 5,870,302, issued February 1999, both to Oliver, and U.S. Pat. No. 6,102,061, issued August, 2000, U.S. Pat. No. 6,227,220, issued May, 2001, U.S. Pat. No. 6,298,285, issued October, 2001, U.S. Pat. No. 6,892,113, issued May, 2005, U.S. Pat. No. 6,892,114, issued May, 2005, U.S. Pat. No. 6,944,523, issued September, 2005, U.S. Pat. No. 6,947,811, issued September, 2005 and U.S. Pat. No. 6,950,728, issued September, 2005, all to Addink, all of which are hereby incorporated by reference in their entirety.

Even with these ET irrigation controllers, the consumer will generally modify the irrigation schedule such that it's different from scheduled amounts that were based on ETo. For example, a consumer typically makes adjustment to increase irrigation amount when he sees a dry spot on the landscape, and forgets to change the controller setting back to the original setting when such increase is no longer needed. A modification of the irrigation system to improve distribution uniformity might have corrected the dry spot problem without requiring the consumer to change the controller setting. Also, ET controllers do not provide feedbacks to homeowners with respect to the efficiency of their watering practices.

What is required is a method whereby the irrigation controller automatically modify future run-times to consistently irrigate the landscape based on the amount of water that should be applied to the landscape, based on ETo information.

All referenced patents, applications and literatures are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

SUMMARY OF THE INVENTION

Methods and apparatus are provided herein in which a controller runs software to modify irrigation run-times as a function of the difference between: (a) a calculated volumetric irrigation amount; and (b) a preferred irrigation amount that is at least partly based on an evapotranspiration (ETo) value.

Contemplated controllers preferably perform these and other functions using a microprocessor programmed to: (a) determine a calculated volumetric irrigation amount using the irrigation water flow information and user inputted run-times; (b) determine a preferred irrigation amount that is at least partly based on an ETo value and an area of an irrigated site; and (c) modify run-times as a function of the calculated volumetric irrigation amount and the preferred irrigation amount. The ETo value can be obtained from a local source, a distal source, or some combination. All workable functions are contemplated, including dividing of the preferred irrigation amount by the calculated volumetric irrigation amount to arrive at a modifying factor. The modifying factor will be used to modify irrigation run-times that are executed to the landscape by the irrigation controller.

Volumetric irrigation amount is preferably calculated using a flow meter, which can be integrated into, or separate from, the controller. The calculations can be based upon one or more of flow data, pressure data, and signature data. Additionally or alternatively, calculated volumetric irrigation amount can be based at least in part on inputted irrigation run-times.

Preferred irrigation amounts can be at least partly based on the area of the irrigated site, and/or water pressure data. In addition to being at least partly based on an ETo value and the area of the irrigated site, it is anticipated that the preferred irrigation amount can also be based on a percent adjust value.

The inventive concepts can be applied to any type of site, including for example, residential, commercial, or industrial sites.

Various objects, features, aspects, and advantages of the present invention will become more apparent from the following detailed description that describes a preferred embodiment of the invention, along with the accompanying drawings in which like numerals represent like components.

DETAILED DESCRIPTION

A. Terminology

1. Irrigation controller: A device designed according to the Water Saving System algorithm described in this document. See Section Irrigation Controller.

2. Inputted irrigation run-times ($T_i$ min/irrigation-cycle): A per station duration of time, in units of minutes per irrigation-cycle (e.g., min/day), that is inputted into the irrigation controller. See Section Inputted Irrigation Run-Times.

3. Inputted area (A sqf): The area of the irrigated site, in units of square feet, that is inputted into the irrigation controller. See Section Inputted Area.

4. Flow-rate ($F_i$ g/min): For each irrigation station, the flow-rate is the amount of water applied during a specific period of time. Flow-rate is expressed in units of gallons per minute. See Section Flow & Pressure.

5. Calculated volumetric irrigation amount (CalcAmount g/irrigation-cycle): The amount of water, in units of gallons per irrigation-cycle (e.g., g/day), the irrigation controller would have applied, if it applied the inputted irrigation run-times without any modifications.

6. Preferred irrigation amount (PrefAmount g/irrigation-cycle): The amount of water, in units of gallons per irrigation-cycle (e.g., g/day), the irrigation controller would have ideally applied if it applied proper modifications to the inputted irrigation run-times, according to the present invention.

7. Evapotranspiration (ETo in./irrigation-cycle): A collective term, in units of inches per irrigation-cycle (e.g., in./day), that includes water discharged to the atmosphere as a result of evaporation and transpiration, at an irrigation site. See Section Evapotranspiration & Inputted % Adjust.

8. Inputted percent adjust (% Adjust): A unit-less multiplier, expressed as a percentage, that is used to obtain a desired preferred irrigation amount. See Section Evapotranspiration & % Adjust.

9. Modified irrigation run-times ($T'_i$ min/irrigation-cycle): A per station duration of time, in units of minutes per irrigation-cycle (e.g., min/day), that is determined by the irrigation controller according to the present invention.

10. Irrigation error (Err g/irrigation-cycle): The irrigation error, in units of gallons per irrigation-cycle (e.g., g/day), is defined as the daily difference (due to pressure and other anomalies) between the preferred irrigation amount and the actual irrigation amount, as measured by a flow sensor at the irrigated site.

B. Overview

Figure 1:
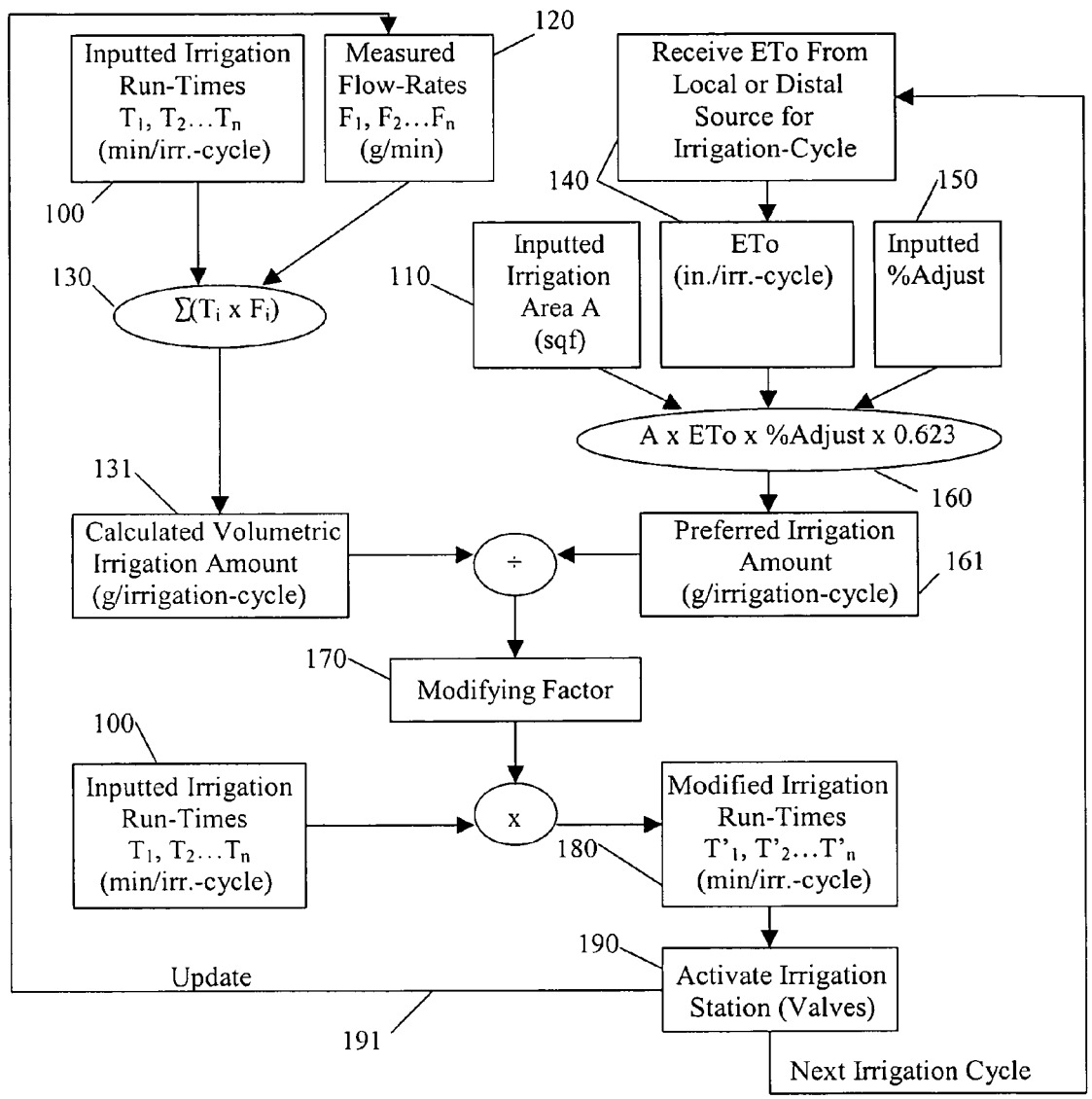
FIG. 1 is a flow chart of a proposed Water Saving System.

A preferred embodiment of contemplated irrigation controllers, according to the Water Saving System algorithm, is illustrated in FIG. 1. Here, an irrigation controller has inputted irrigation run-times for each station 100 and an inputted area of the irrigated site 110. The irrigation controller has sensors to determine the flow-rate per station 120. Subsequent sections of this document will discuss inputted irrigation run-times, inputted area, and flow-rate.

The irrigation controller determines the irrigation amount of station i by multiplying the inputted irrigation run-time $T_i$ 100 and the flow-rate $F_i$ 120. And, by adding the irrigation amount of all stations 1, 2 . . . N, the irrigation controller determines the total calculated volumetric irrigation amount (CalcAmount) 131:

$$\text{CalcAmount}(g/\text{irrigation-cycle}) = \Sigma(T_i(\text{min/irrigation-cycle}) \times F_i(g/\text{min})), i=1, 2 \ldots N \quad 130$$

For example, consider three stations with inputted irrigation run-times of 18 min/day, 16 min/day, and 20 min/day (in this example, the irrigation-cycle is assumed to be one day) and corresponding flow-rates of 10 g/min, 9 g/min, and 7 g/min. The calculated volumetric irrigation amount is:

$$\text{CalcAmount} = (18 \times 10) + (16 \times 9) + (20 \times 7) = 464 \text{ g/day}$$

The irrigation controller obtains evapotranspiration (ETo) 140 corresponding with the irrigation-cycle (see Section Evapotranspiration & % Adjust), and multiplies it by the inputted percent adjust 150 and the inputted irrigation area 110 to determine the preferred irrigation amount (PrefAmount) 161:

$$\text{PrefAmount}(g/\text{irrigation-cycle}) = A(\text{sqf}) \times \text{ETo}(\text{in./irrigation-cycle}) \times \% \text{ Adjust} \times 0.623 \text{ (g/sqf} \times \text{in.)} \quad 160$$

Here, the value 0.623 (g/sqf×in.) is used as a conversion factor to arrive at the preferred irrigation amount in units of gallons per irrigation cycle. Continuing with the example, consider an irrigated site with inputted area of 3000 sqf., and assume an ETo value of 0.25 in./day and a % Adjust of 80%. The preferred irrigation amount is:

$$\text{PrefAmount} = 0.25 \times 0.80 \times 3000 \times 0.623 \approx 374 \text{ g/day}$$

The irrigation controller divides the preferred irrigation amount 161 by the calculated volumetric irrigation amount 131 to obtain the modifying factor (ModFactor) 170:

$$\text{ModFactor} = \text{PrefAmount}(g/\text{irrigation-cycle}) \div \text{CalcAmount}(g/\text{irrigation-cycle})$$

In our running example, the modifying factor is determined as follows.

$$\text{ModFactor} = 374 \div 464 \approx 0.81$$

The irrigation controller multiplies the modifying factor 170 times the inputted irrigation run-times 100 to obtain the modified irrigation run-times 180:

$$T'_i(\text{min/irrigation-cycle}) = T_i(\text{min/irrigation-cycle}) \times \text{ModFactor}, i=1, 2 \ldots N$$

In our running example, the modified irrigation run-times for stations 1, 2, and 3 is determined as follows:

$$T'_1 = 18 \times 0.81 \approx 14.6 \text{ min/day}$$

$$T'_2 = 16 \times 0.81 \approx 13.0 \text{ min/day}$$

$$T'_3 = 20 \times 0.81 \approx 16.2 \text{ min/day}$$

The controller carries out the above-described calculations prior to activating the next irrigation-cycle 190. Additionally, the most up-to-date flow-rate measurements (e.g., from the most recent irrigation cycle) can be saved for use during the next irrigation-cycle and iteration of the Water Saving System algorithm 191.

C. Reducing Irrigation Error

Figure 2:
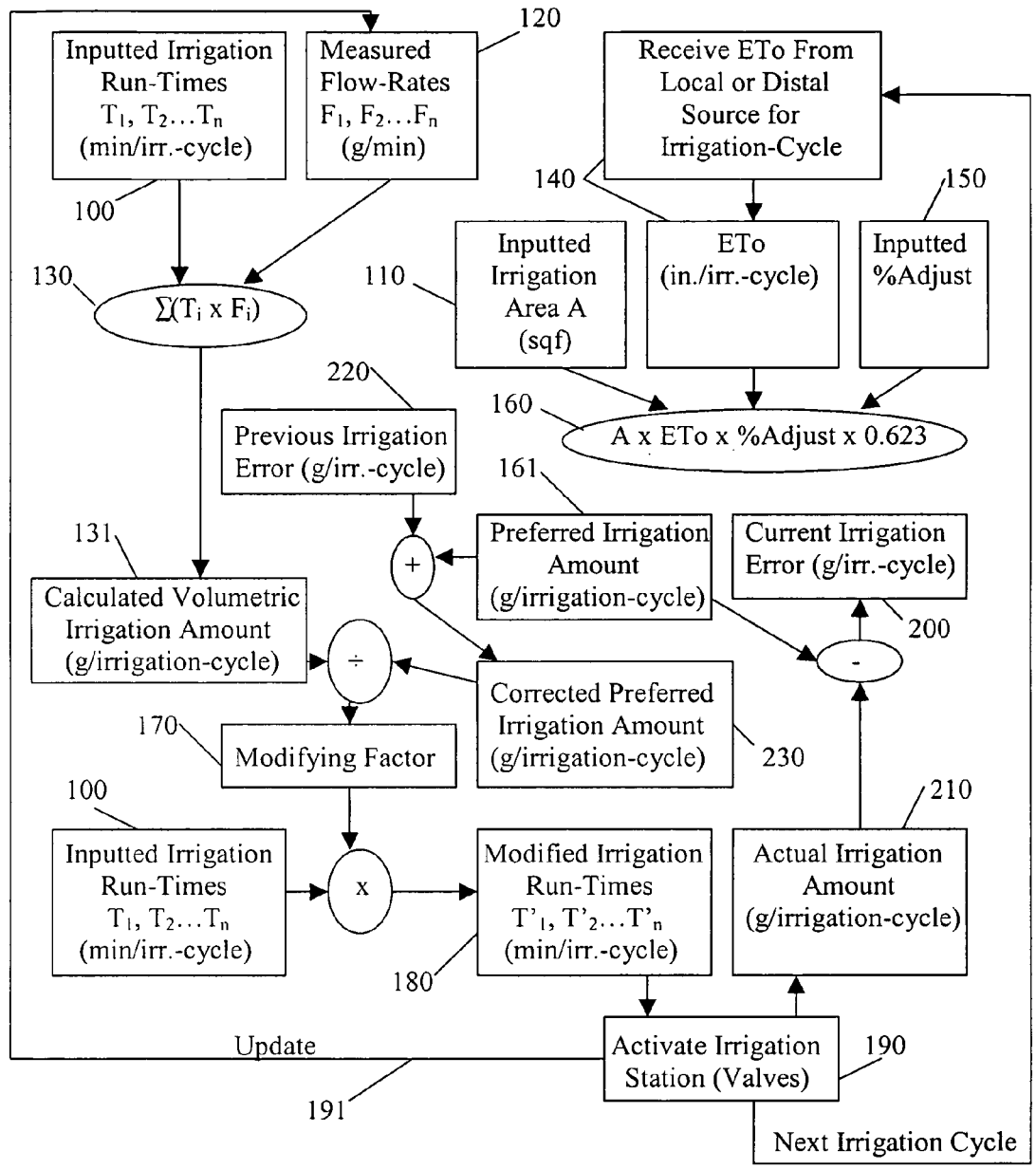
FIG. 2 is a flow chart of a proposed Water Saving System with Feedback.

As the previous section describes, the Water Saving System algorithm modifies, prior to the execution of each irrigation-cycle, the inputted irrigation run-times to irrigate the landscape with a preferred irrigation amount. This preferred irrigation amount is based on ETo, inputted % Adjust, and the inputted area of the irrigated site. However, in a typical application, the flow-rates are subject to variation (e.g., as a result of changing pressure or deteriorating irrigation system). To improve accuracy, a feedback system can be used to limit error in the long term, as illustrated in FIG. 2 (Discussion to FIG. 1 describes item numerals 100-191).

The irrigation error (Err) 200 for a given irrigation-cycle is the difference between the actual irrigation amount (ActualAmount) 210, as measured by a flow sensor at the irrigated site (see Section F. Flow & Pressure), and the preferred irrigation amount 161:

Err(g/irrigation-cycle)200=ActualAmount(g/irrigation-cycle)210−PrefAmount(g/irrigation-cycle)161

Note that the irrigation error may be positive or negative, indicating over or under irrigation respectively. Prior to calculating the modified irrigation run-times, the irrigation controller adds the irrigation error of the previous irrigation-cycle 220 to the preferred irrigation amount of the current irrigation-cycle 161 in order to obtain a corrected preferred irrigation amount 230. Subsequently, the corrected preferred irrigation amount 230 is used to compute the modifying factor 170 and arrive at the modified irrigation run-times 180.

D. Inputted Irrigation Run-Times

For each irrigation station, a run-time (in minutes per irrigation-cycle) is inputted into the irrigation controller. For brevity, and without loss of generality, we assume that an inputted irrigation run-time for irrigation station i is the duration of time in minutes. Station i is active during an irrigation-cycle. Furthermore, we assume that station i is activated continuously for the entire duration of time defined by the inputted irrigation run-time.

A user can determine the inputted irrigation run-times by referring to appropriate charts and lookup tables, or derive run-times from a model based on one or more of the soil, plant, climate, and precipitation rate parameters, or through other appropriate means. Moreover, the irrigation controller can be shipped from the factory with default values for inputted irrigation run-times.

Regardless of the source of the inputted irrigation run-times, the Water Saving System algorithm arrives at the modified irrigation run-times, which is used for irrigating the landscape.

In one preferred implementation, an irrigation schedule can be inputted in addition to inputted irrigation run-times. For instance, the irrigation schedule can include: multiple cycles per day, skipping of irrigation days on particular days of the week, cycle-and-soak style of irrigation to maximize irrigation efficiency, and/or accumulation of a minimum irrigation amount prior to activation, etc. In the presence of such irrigation options, the Water Saving System algorithm of contemplated controllers is modified to replace inputted irrigation run-times with the inputted cycle of irrigation run-times during the calculations. Specifically, by combining the inputted irrigation schedule with the inputted irrigation run-times in such a way as to determine the total irrigation run-times for each repeated irrigation cycle, the inputted cycle of irrigation run-times is also determined. Conversely, the modified irrigation run-times will need to be divided according to the irrigation schedule prior to activation.

E. Inputted Area

The inputted area is a measure of the size of the irrigated site and is usually represented in square feet. Preferably the area of the irrigated site is derived from aerial photographs. Alternatively, the area of the irrigated site may be derived by direct measurement of the irrigated site. It can be appreciated that the area of the irrigated site can be determined by means other than the two mentioned above, including estimating based on the residential lot size and so forth.

The irrigated site can be a residential site, a commercial site, or any other site to which irrigation is applied.

F. Flow & Pressure

A preferred embodiment of the present invention can have a shared flow meter (i.e., one that measures the irrigation site, indoor, and non-irrigation related outdoor water usage) to determine the flow-rate of each station during a particular irrigation-cycle. Alternatively, a dedicated irrigation flow meter can be used. If the flow-rate is determined based on flow data from a shared flow meter, it is preferably accomplished through the use of signature data (see the section G, Flow Determination Based on Signature Data, for a more detailed discussion on signature data). Also, see the following issued and pending patents that discuss in greater detail the use of signature data for improving water use efficiency of an irrigation system: U.S. Pat. No. 6,963,808 issued Nov. 8, 2005 to Addink and pending U.S. application Ser. No. 10/297,146, all of which are hereby incorporated by reference in their entirety.

A preferred irrigation controller can use the most recently observed flow-rate to make calculations for the next irrigation-cycle. Moreover, the irrigation controller can have pre-programmed default flow-rates for bootstrapping a system during its very first irrigation-cycle.

The contemplated Water Saving System can additionally have a water pressure sensor to further improve accuracy. The measured flow-rate $F_{old}$ and corresponding pressure $P_{old}$ can be saved at the end of each irrigation-cycle. Preceding the next irrigation-cycle, the current pressure $P_{new}$ is used to estimate the current flow-rate $F_{new}$ according to the following flow-rate/pressure relationship:

$$F_{new}=F_{old}\times\sqrt{(P_{new}/P_{old})}$$

G. Flow Determination Based on Signature Data

Figure 3:
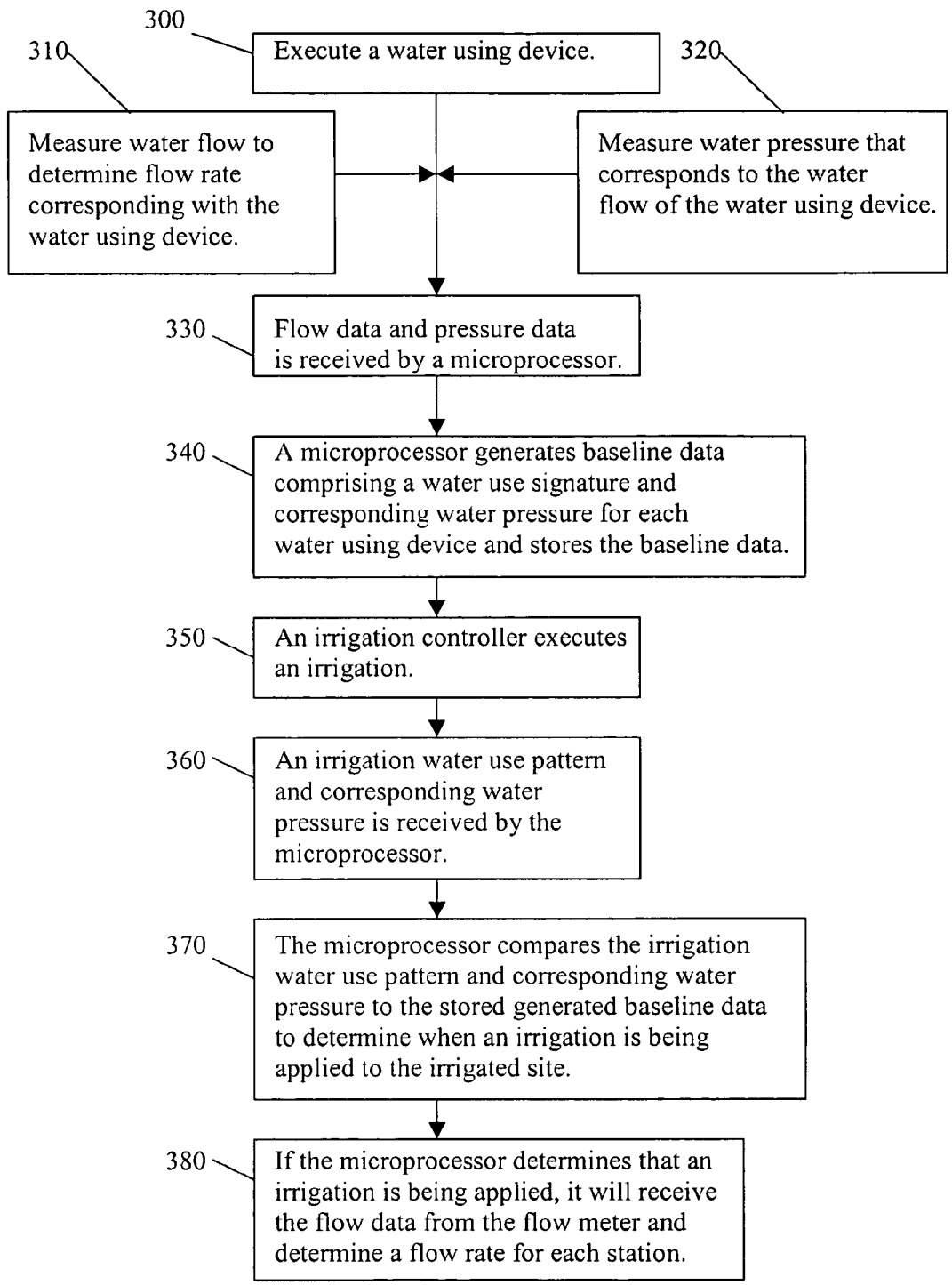
FIG. 3 is a flow chart of the steps involved in the use of the signature method for determining the calculated volumetric irrigation amount.

FIG. 3 is a flow chart of preferred steps involved in the use of signature data for determining the flow rate of a water using device. The first step involves executing a water-using device 300. Preferably, only one water-using device is operated at a time to generate "clean" baseline data. The second step involves measuring water flow to determine flow rate corresponding with the water-using device 310. Because water pressure affects water flow rates, corresponding water pressure is also measured 320.

The flow data and pressure data are transmitted to a microprocessor 330. The microprocessor subsequently generates baseline data comprising a water use signature and corresponding water pressure information for each water-using device. The microprocessor also stores the baseline data 340.

In operation, when an irrigation controller 350 executes an irrigation, an irrigation water use pattern and corresponding water pressure is transmitted to the microprocessor 370. The microprocessor compares the irrigation water use pattern and corresponding water pressure 360 to the stored generated baseline data 350 to determine if an irrigation is being applied 370. If the microprocessor determines that an irrigation is being applied, it will receive flow data from the flow meter and determine the flow rates for each station 380.

H. Evapotranspiration & Inputted % Adjust

Evapotranspiration (ETo) is a collective term, in units of inches per irrigation-cycle (e.g., in./day), that includes water discharged to the atmosphere as a result of evaporation and transpiration, at an irrigation site.

The ETo value may be obtained from a local source or a distal source. If ETo is obtained from a distal source, it is preferably from a distal source where its ETo value closely approximates the weather conditions that exist at the irrigated site.

The inputted percent adjust (% Adjust) parameter is a unitless multiplier, expressed as a percentage, used to obtain a desired preferred irrigation amount. In some applications, the % Adjust may reflect a % ETo value that is pre-determined by a Water District and used as a baseline above which steep water conservation pricing take effect.

I. Irrigation Controller Circuitry

The irrigation controller circuitry is capable of executing the Water Saving System algorithm as defined in the Overview Section of this document.

Figure 4:
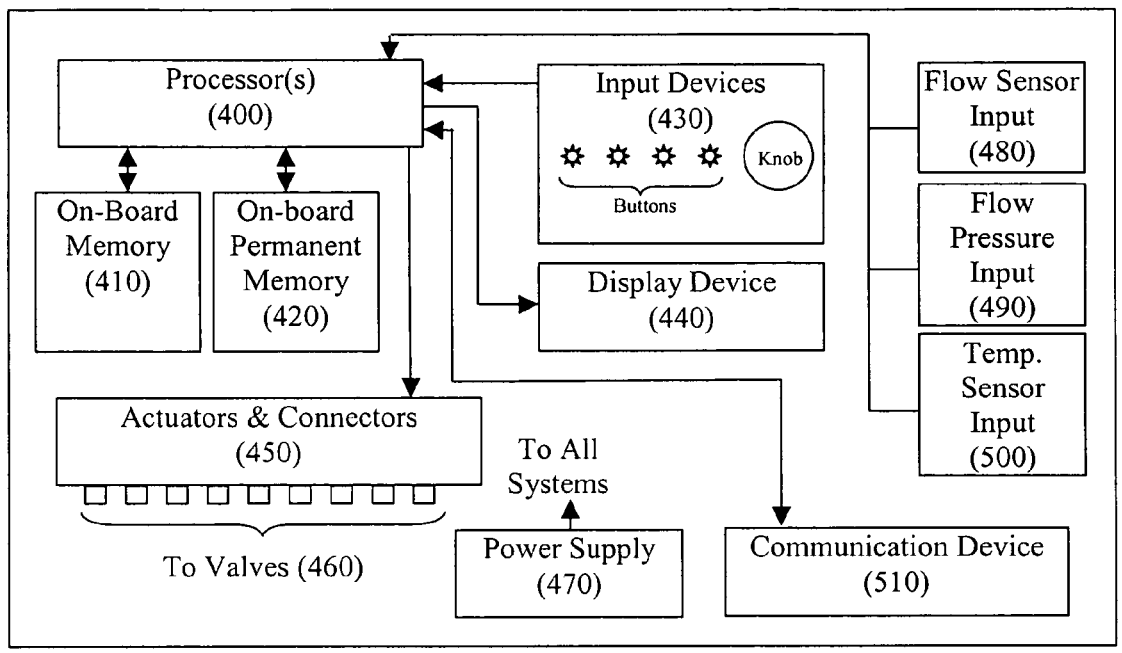
FIG. 4 is a schematic of a proposed irrigation controller circuitry.

Referring to FIG. 4, preferred embodiments of the irrigation controller include: one or more microprocessors (400) to perform calculations; on-board memory (410) (e.g., RAM) to store intermediate results; and on-board permanent memory (420) (e.g., EEPROM) to store persistent data, such as inputted values, previously measured values, and past irrigation activities (i.e., archived and historical values). In one embodiment of the current invention, computations and processes required by an irrigation controller is carried out by at least partial partitioning of tasks among the one or more processors and memories.

The irrigation controller can include manual input devices (430) (e.g., buttons and/or knobs) and a display device (440) (e.g., a text or graphic Liquid Crystal Display (LCD)) to enable interactions, provide feedback, and receive commands from an operator of the irrigation controller.

In one preferred aspect of the inventive subject matter, the irrigation controller includes electrical actuators and connectors (450) corresponding to the plurality of irrigation stations. The actuators and connectors feed electrical signals to the valves (460) which control water flow to corresponding regions of the irrigation site. The electrical actuators are preferably based on electro-mechanical relays or solid-state electronic devices (e.g., TRIACs). Additionally, the irrigation controller is contemplated to include a power source (470) (e.g., a Wall Transformer) to power the on-board electronics as well as to supply electricity to the irrigation valves.

Still further contemplated embodiments of the irrigation controller include circuitry to accommodate a flow sensor input (480), an optional pressure sensor input (490), an optional temperature sensor input (500) and other sensors. Contemplated irrigation controllers can include an on-board communication device (510) (e.g., an embedded modem, pager, mobile telephone, local area network (LAN) adaptor, or wireless area network (WAN) adaptor, etc.) for data communication with a distal system. Alternatively, preferred embodiments of the irrigation controller can include interface circuitry to use attached communication devices (e.g., an external modem, pager, mobile telephone, local area network (LAN) adaptor, or wireless area network (WAN) adaptor, etc.) for data communication with a distal system.

Suitable embodiments can be produced using known components, and programmed and/or modified in accordance with the functionality set forth herein.

Thus, specific embodiments and applications of water savings system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A controller comprising a microprocessor configured to execute software stored in a memory that uses water use signature data to distinguish irrigation water usage from at least one of indoor and non-irrigation related outdoor water usage, and modifies an irrigation run time as a function of the irrigation water usage, and wherein the controller further modifies the irrigation run time in part by dividing an irrigation amount by a calculated volumetric irrigation amount to arrive at a modifying factor and the controller uses the modifying factor to modify the irrigation run time.

2. The controller of claim 1, wherein the microprocessor calculates the irrigation water usage based at least in part on flow meter data from a flow meter.

3. The controller of claim 2, wherein the flow meter is a dedicated irrigation flow meter.

4. The controller of claim 2, wherein the microprocessor receives water pressure data that corresponds with the flow meter data.

5. The controller of claim 1, wherein the microprocessor calculates the irrigation water usage based at least in part on inputted irrigation run-times.

6. The controller of claim 1, wherein the controller further modifies the irrigation run time as a function of an evapotranspiration (ETo) value.

7. The controller of claim 6, wherein the ETo value is obtained from a local source.

8. The controller of claim 6, wherein the ETo value is obtained from a distal source.

9. The controller of claim 1, wherein the controller further modifies the irrigation run time at least partly based on an area of the irrigated site.

10. The controller of claim 1, wherein the controller further modifies the irrigation run time at least partly based on a percent adjust value of the irrigation amount.

11. A method of controlling irrigation, comprising:
using flow pattern water use signature data to distinguish irrigation water usage from at least one of indoor and non-irrigation related outdoor usage;
using the flow pattern water use signature data to calculate a volumetric irrigation amount;

using a controller to modify irrigation run-times as a function of (a) the calculated volumetric irrigation amount and (b) a preferred irrigation amount that is at least partly based on an evapotranspiration (ETo) value; and correcting the modified irrigation run-times based on a difference between an actual irrigation amount and the preferred irrigation amount.

12. The method of claim 11, wherein the actual irrigation amount is at least partly based on water pressure data.

13. The method of claim 11, wherein the difference is a negative value.

14. The method of claim 11, wherein the difference is a positive value.

15. An irrigation system, comprising;

a flow meter that provides irrigation water flow information that is based at least in part on a difference in flow pattern water use signature data between an irrigation device and a non-irrigation device; and a microprocessor programmed to modify an irrigation run time as a function of the difference, a calculated volumetric irrigation amount, and a preferred irrigation amount.

* * * * *